(12) United States Patent
Kim et al.

(10) Patent No.: US 7,549,765 B2
(45) Date of Patent: Jun. 23, 2009

(54) FLASHLIGHT WITH MULTISTAGE SWITCH AND ARC LAMP OPERATION SENSOR

(75) Inventors: Paul Y. Kim, Santa Ana, CA (US); William A. Hunt, Foothill Ranch, CA (US); Lai Chang Tang, Chino Hills, CA (US)

(73) Assignee: SureFire, LLC, Fountain Valley, CA (US)

( * ) Notice: Subject to any disclaimer, the term of this patent is extended or adjusted under 35 U.S.C. 154(b) by 66 days.

(21) Appl. No.: 11/700,739

(22) Filed: Jan. 30, 2007

(65) Prior Publication Data

US 2008/0180032 A1 Jul. 31, 2008

(51) Int. Cl.
*F21L 4/04* (2006.01)
(52) U.S. Cl. .................. 362/204; 362/205; 362/206
(58) Field of Classification Search .......... 362/202, 362/205, 206, 208, 394, 276, 184, 204; 439/909, 439/66, 699.2; 200/1 R, 1 B, 519
See application file for complete search history.

(56) References Cited

U.S. PATENT DOCUMENTS

| | | | | |
|---|---|---|---|---|
| 1,964,467 A | * | 6/1934 | Hunter et al. ............... | 361/160 |
| 6,431,908 B1 | * | 8/2002 | Beck et al. .................. | 439/500 |
| 6,798,228 B2 | * | 9/2004 | Cuevas ....................... | 324/755 |
| 7,448,917 B2 | * | 11/2008 | Liao et al. ................... | 439/660 |
| 2005/0237737 A1 | * | 10/2005 | Kim ............................ | 362/197 |

* cited by examiner

*Primary Examiner*—Anabel Ton
*Assistant Examiner*—Kevin Spinella
(74) *Attorney, Agent, or Firm*—Haynes and Boone, LLP

(57) ABSTRACT

A flashlight has a body containing control circuitry, with a lamp connected to the body and to the control circuitry. A photodetector is connected to the body and the control circuitry, and faces the lamp to sense an operating condition of the lamp. The control circuitry operates the lamp in a start up mode until signaled by the photodetector that the lamp is properly operating. After this, the lamp is operated in a normal mode. The flashlight may have a switch with a button that moves through a range of positions. The switch may have several contact elements, and the button may have an actuator registered with each of the contact elements. The actuators may be of different heights, to provide a sequence of switch operation. Some of the actuators may be movable to allow the button to be actuated further after an initial contact is made.

11 Claims, 4 Drawing Sheets

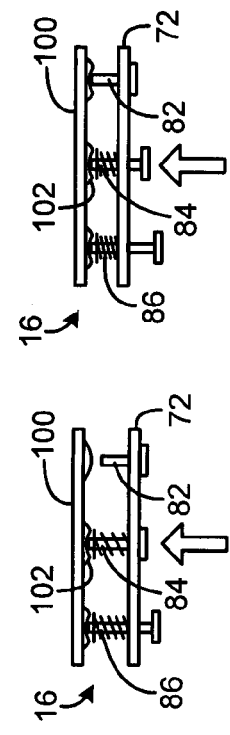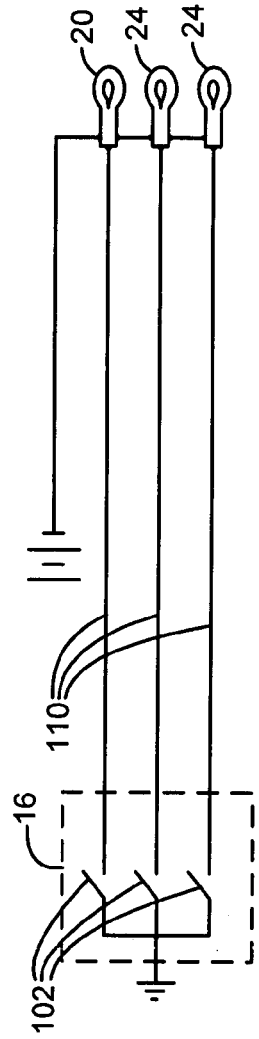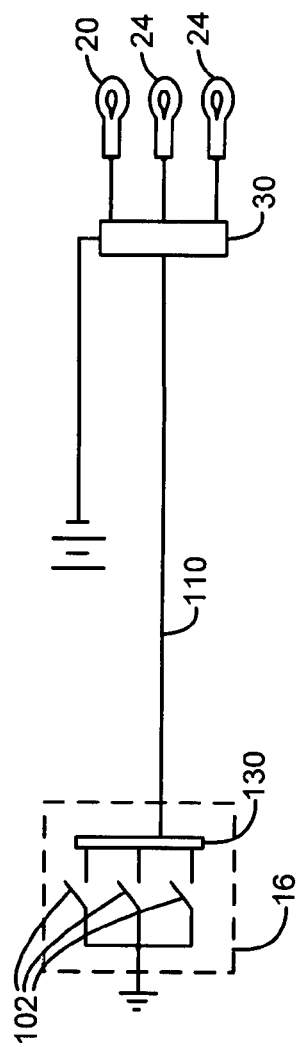

FLASHLIGHT WITH MULTISTAGE SWITCH AND ARC LAMP OPERATION SENSOR

FIELD OF THE INVENTION

This invention relates to HID (high-intensity discharge) flashlights and switching mechanisms, and more particularly to switching for multiple states.

BACKGROUND OF THE INVENTION

Flashlights are conveniently-sized battery powered portable light sources, which provide the user with a source of illumination. The illumination could be white light or light of a specific color, or even light outside the visible range of wavelengths, such as ultra violet or infrared radiation. The "color" or wave length of the light will depend on the nature of the light source or light sources used in the flashlight. These would typically be either tungsten lamps, ARC lamps, light emitting diodes (LEDs), lasers, or any other emitter.

Because of the general nature of flashlights and their wide range of applications, it is very desirable for a flashlight to be able to emit, at the user's direction, different levels of light output, different colors or wavelengths of light, and/or other different operating modes beyond "on and off". This can be accomplished using multiple light sources or a single light source, which can be adjusted to provide different levels of light output.

The principal light source used in flashlights is the tungsten filament lamp, as alternatives suffer inadequate illumination, or excessive battery consumption. Tungsten filament lamps, however, are limited in their ability to generate extremely high light levels. Arc lamps or HID lamps are capable of higher brightness levels.

However, HID lamps do not start up simply by applying the operating voltage. Such lamps require a start up mode that is very different from the operating mode. If the start up mode were continued indefinitely, energy would be wasted, operation compromised, and damaged risked. Start up mode requires a pulsing of higher than normal voltage to strike an arc. Thus, existing lamps use a limited duration start up mode. However, this may overstress the lamp or be inadequate duration, depending on conditions.

Flashlights having multiple operating modes (more than just on and off) have employed a variety of different switch types, including slider switches. In some existing systems, the switching system consists of a mechanical contact arrangement where the physical axial displacement of a switch system element (either by direct finger or thumb pressure or by rotation of a tail cap or head of the flashlight) causes first one lamp to be connected to the battery, and additional applied pressure or flashlight element rotation causes the second lamp to be connected to the battery. In some cases, the design is such that the first lamp is disconnected when the second lamp is connected to the battery. In other cases, the first lamp remains connected when the second lamp is connected. For some applications, the contacts may be fouled by arcing when the contacts are in close proximity, but not firmly in contact.

It should be noted that the term "lamp" is used in its most general meaning, namely that of any light source (which could be a tungsten filament lamp, an LED, a laser or an ARC Lamp) of any wavelength.

SUMMARY OF THE INVENTION

The present invention overcomes the limitations of the prior art by providing a flashlight having a body containing control circuitry, with a lamp connected to the body and to the control circuitry. A photodetector is connected to the body and the control circuitry, and faces the lamp to sense an operating condition of the lamp. The control circuitry operates the lamp in a start up mode until signaled by the photodetector that the lamp is properly operating. After this, the lamp is operated in a normal mode. The flashlight may have a switch with a button that moves through a range of positions. The switch may have several contact elements, and the button may have an actuator registered with each of the contact elements. The actuators may be of different heights, to provide a sequence of switch operation. Some of the actuators may be movable to allow the button to be actuated further after an initial contact is made.

BRIEF DESCRIPTION OF THE DRAWINGS

FIGS. 4a-4d are simplified side views of the switch assembly of figure to showing a sequence of operation.

FIGS. 5 and 6 are electrical block diagrams of alternative electronic configurations of the invention.

DETAILED DESCRIPTION OF A PREFERRED EMBODIMENT

Figure 1:
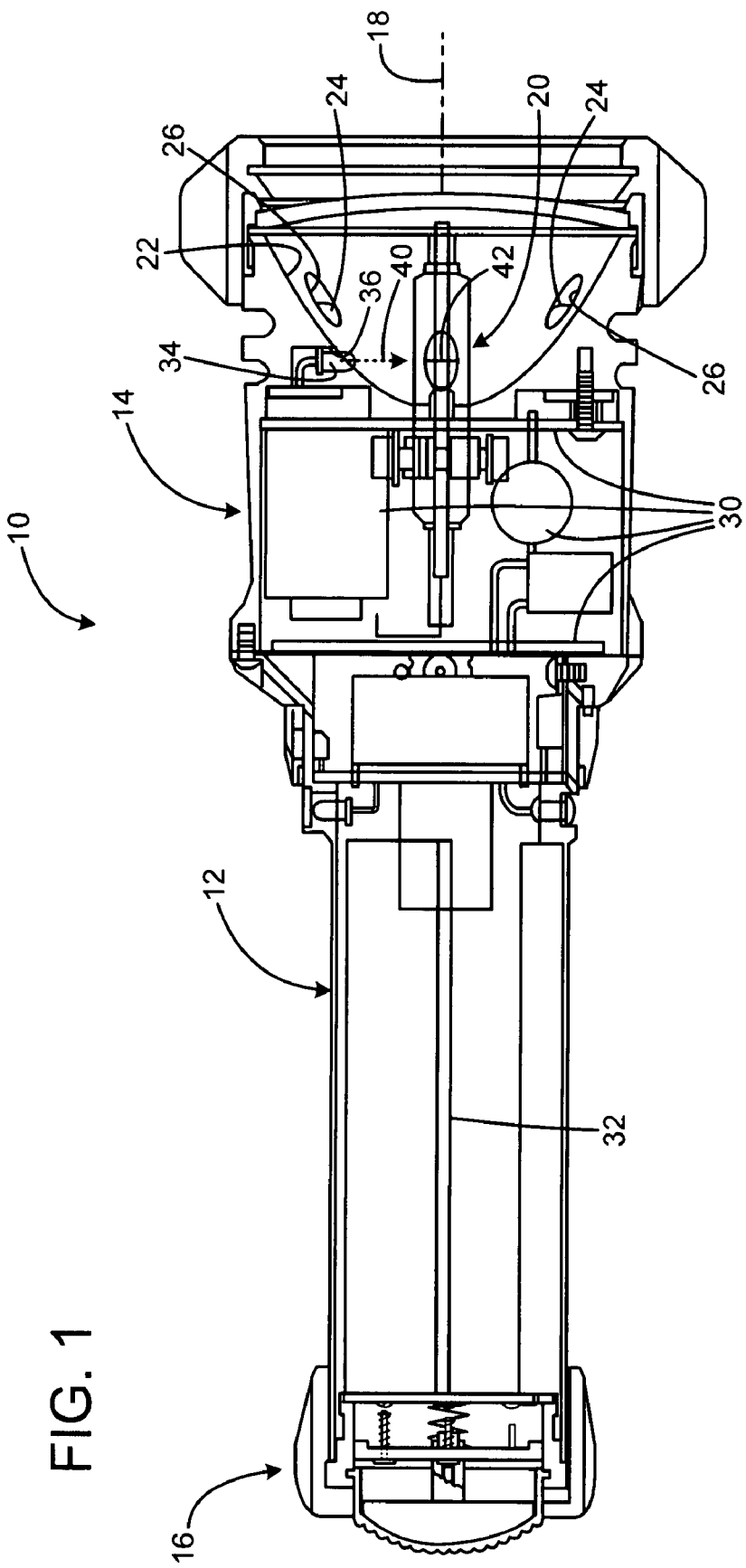
FIG. 1 is a sectional side view of a flashlight according to a preferred embodiment of the invention.

FIG. 1a shows a flashlight 10 according to a preferred embodiment of the invention. The flashlight includes a major housing portion 12 having a head 14 connected at a forward end, and a rear tailcap 16 connected at a rear end, and having a switch that will be discussed in detail below. The major portions of the housing are cylindrical, and define an axis 18. The head 14 includes an arc lamp 20 at the focus of a reflector 22 that projects a beam in the forward direction when the light is operated. Peripheral LED lamps 24 are projected forward, and reside in apertures 26 in the reflector.

Power and control circuitry 30 is connected to the lamp 20 and lamps 26, and to batteries 32 in the housing 12. A photodetector 34 is also connected to the circuitry, and is positioned within an aperture 36 in the reflector 22. The photodetector defines an optical axis 40 that is perpendicular to the optical axis 18, and which intersects a central illumination point 42 of the arc lamp 20. Thus, the photodetector is lateral to the arc lamp, and is arranged to sense whether or not the arc lamp is operating. The photodetector has a limited diameter. Thus, it subtends a limited angle, blocking only a very limited portion of the field of emission of the lamp, and creating minimal disruption or shadowing in the beam pattern.

In the preferred embodiment, an arc lamp start up procedure is initiated in response to the user actuating the switch button. When the start up procedure has succeeded in initiating illumination of the arc lamp, the photodetector senses the illumination, converting it into an electrical signal that is sensed by the control circuitry. The control circuitry then responds by ceasing the start up procedure, and providing normal power to the arc lamp for sustained illumination.

Figure 2:
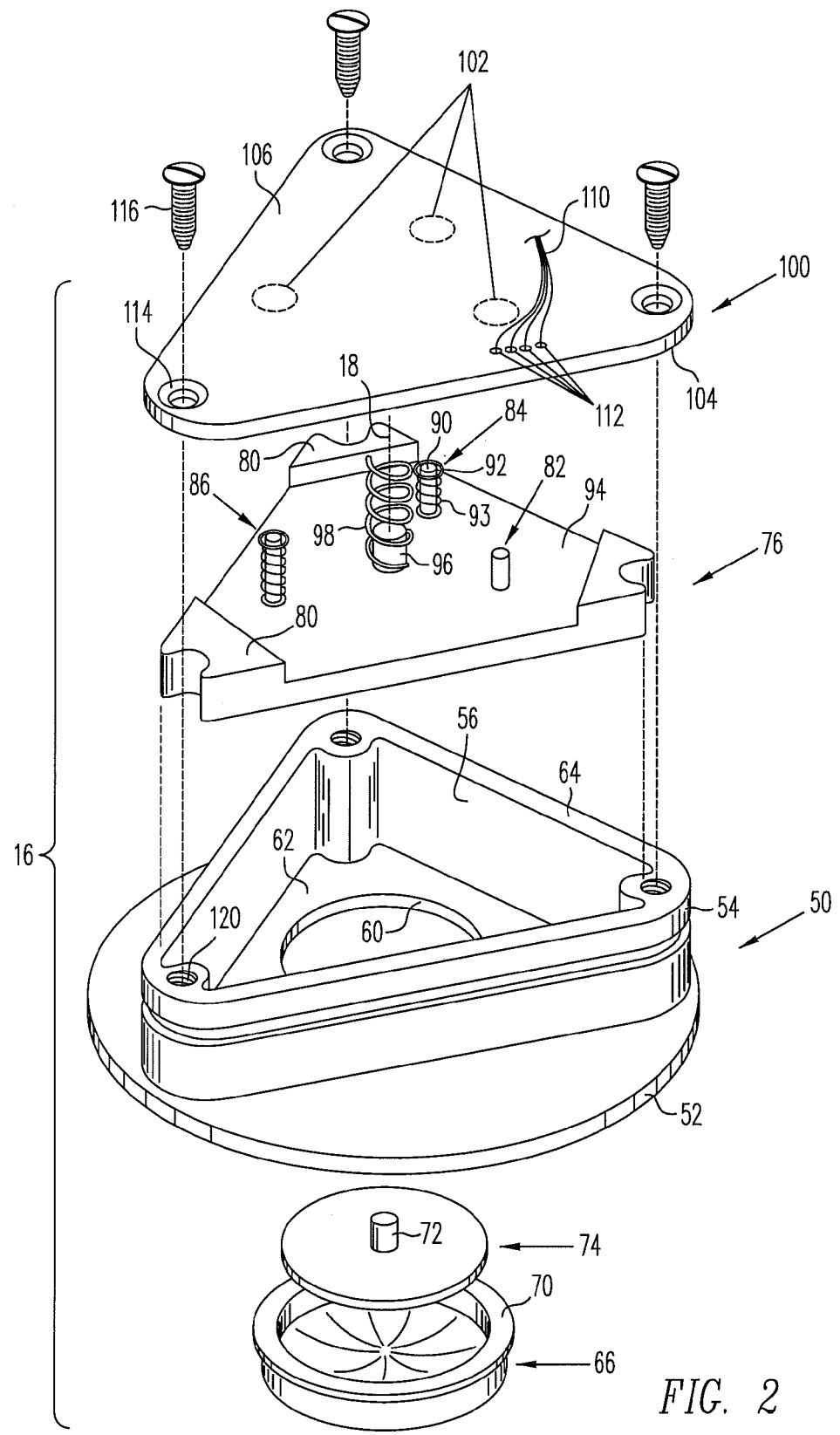
FIG. 2 is an exploded view of the switch assembly according to a preferred embodiment of the invention.

FIG. 2 shows an exploded view of the tailcap switch assembly 16. A frame 50 has a circular flange 52 with a triangular wall or skirt portion 54 that extends in a direction toward the lamp. The triangular wall defines a cavity 56. A circular aperture 60 is formed in the floor 62 away from a forward rim 64 of the wall. An elastomeric button cap 66 has a forward rim 70 that is received in the aperture 60, and which defines a cavity 72 that receives a rigid plastic button support 74 in the form of a disc having a diameter that largely fills the cavity. The disc has a protruding post 72 on a forward face, and has a rear face that is domed to match the domed surface of the button cap.

A triangular piston 76 is closely received within the cavity 56, and has a periphery shaped to entirely fill the cavity. The piston has an enhanced thickness at corner portions 80 to ensure that the piston remains in stable orientation in the cavity. Stability means that the piston does not become canted, even in response to eccentric forces applied axially, but away from the central axis 18 of the piston and flashlight. The piston includes three forwardly protruding actuator pins 82, 84, and 86. Pin 82 is integrally molded with the piston, and is a rigid cylindrical extension of the piston. Pin 84 has a flanged head (not shown) at the rearward side of the piston, and a shank that passes through a small aperture in the piston. Near the forward end 90 of the pin 84, the pin defines a circumferential groove that receives a spring clip 92. A helical compression spring 93 is received between the clip 92 and the forward surface 94 of the piston. The pin 84 protrudes above the surface 94.

The pin 84 thus may be pressed rearwardly through the piston in response to axial forces above a preselected threshold. The spring 93 is preloaded to provide initial retraction only in response to forces greater than a preselected threshold.

Pin 86 has the same structure as pin 84, except that it protrudes by a greater distance from the surface 94 of the piston. A central post 96 supports a helical compression spring 98 that ensures that the piston is biased in the rearward direction, toward the button 66.

A triangular circuit board 100 carries switch elements 102 (to be discussed in detail below) on its lower face 104 (against which the forward end of the piston biasing spring 98 rests), and has an upper face 106 from which a cable 110 extends. The cable is connected to contacts 112 that are electrically connected to the switches 102. The cable extends forward through the housing 12, to control circuitry 30, or directly to lamps, depending on the application. The board defines a fastener hole 114 at each corner for receiving screws 116. The screws engage bores 120 in the forward rim 64 of the triangular wall portion 54 as the periphery of the rear face 104 is secured against the forward rim 64.

Figure 3:
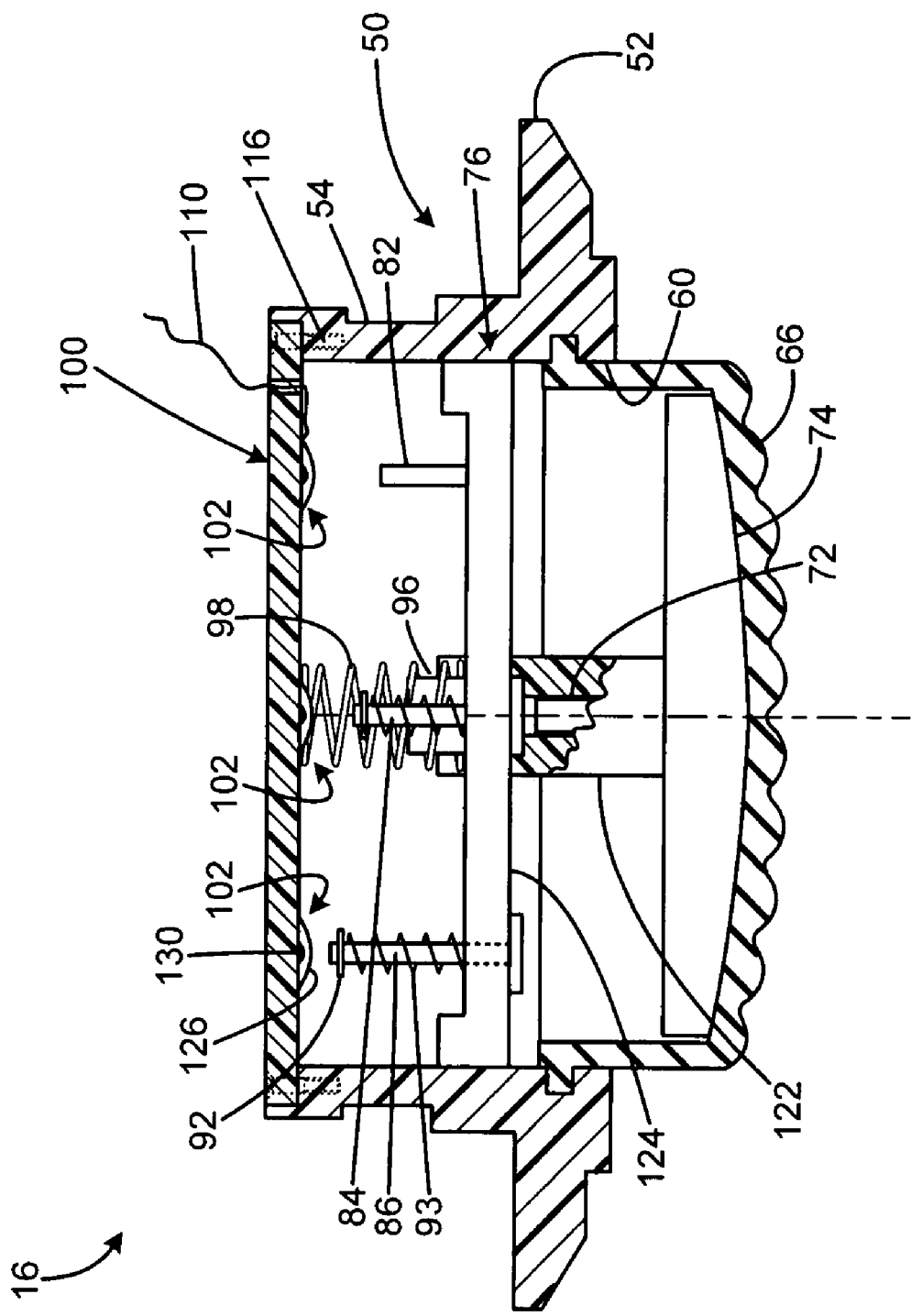
FIG. 3 is an enlarged sectional side view of the switch assembly of FIG. 2.

FIG. 3 shows the tailcap assembly 16 as assembled. The button cap 66 and disc 74 are received in the aperture 60. The post 72 of the disc is received in the bore of a larger post 122 extending from the center of the rear surface 124 of the piston 76. The switches 102 are shown as sheet metal domes 126 that are positioned above central contacts 130, so that the domes invert in response to central pressure from the associated post, and provide a closed circuit. Each of the domes is electrically connected to a different contact from which a wire of the cable 110 extends, and the central contacts are connected to a common ground line.

FIGS. 4a-4d show a sequence of operations of the switch, illustrated in simplified form for clarity. In FIG. 4a the piston 76 is shown in an unactuated position, with the biasing spring 98 (not shown) pushing the button to its most extended position, and with all of the posts spaced apart from the switches 102.

In FIG. 4b, the piston 76 has been advanced to a first actuated position in which post 86 has actuated and created a closed-circuit at the associated switch 102.

In FIG. 4c, the piston 76 has been advanced to a second actuated position in which the second post 84 has contacted its associated switch 102. The first post 86 has been shifted rearward to permit the piston to advance after it has made contact with the board 100, so that its spring generates additional rising force to resist pressure on the button. The first switch remains closed.

In FIG. 4d, the piston 76 has been advanced to a third actuated position in which the third post 82 has contacted its associated switch 102. The first and second posts 86 and 84 have been shifted further rearward, with their heads spaced apart from the rear surface of the piston, and both of their springs contributing additional biasing force. All three switches are closed. While each switches actuation provides a positive tactile feedback in a typical manner of such dome switches, the stepped and increasing spring resistance to button actuation from each post spring as the switches are actuated provides further tactile feedback.

FIG. 5 shows a simplified electronic layout of the invention, in which each of the switches 102 is hardwired via cable 110 to a selected lamp 20, 24. In this embodiment, each of the switches is capable of transmitting current to the selected lamp, and no electronics are required for switching control purposes. In this embodiment, the sequence of operation would involve illuminating some of the peripheral LED lamps when the first switch is actuated, all of the LED lamps when the second switch is actuated, and the central arc lamp when the third switch is actuated.

FIG. 6 shows a simplified electronic layout of the invention, in which more sophisticated electronic control is employed. In this embodiment, the switches are connected to electronic circuitry 130 that may be located on the switch circuit board 100. The cable 110 need not transmit power to the lamps, but carries only a signal generated by the circuitry 130 to indicate which of the switches have been actuated. In a variation on this, the circuitry 130 may be located with the main circuitry 30 adjacent to the lamps, with the cable 110 having multiple lines each associated with a switch 102, and providing a low-level signal indicating the position of the respective switch.

This disclosure is made in terms or preferred and alternative embodiments, and is not intended to be so limited.

The invention claimed is:
1. A flashlight comprising:
an elongated body defining an axis and having a lamp element at a first end and a switch button at a second end;
the switch button being movable through a range of positions;
a switch circuit element having a plurality of contact elements arranged substantially in a plane relative to the switch button;
the switch button having a plurality of circuit actuators implemented by posts substantially parallel to the axis and protruding from the switch button toward the contact elements, wherein the circuit actuators have a plurality of different heights, wherein each of the circuit actuators is registered with a respective one of the contact elements to form an operating pair; and
the operating pairs being spaced apart by different amounts substantially according to the heights of the circuit actuators such that the contact elements are sequentially activated by sequential contact of circuit actuators and the contact elements in response to axial motion of the switch.

2. The flashlight of claim 1 wherein the circuit element is a planar body perpendicular to the axis.

3. The flashlight of claim 1 wherein the switch is a tailcap switch.

4. The flashlight of claim 1 wherein the switch is operable in response to a force directed along the axis to move along the axis.

5. The flashlight of claim 1 wherein at least a selected one of the circuit actuators is a movable element such that after actuating a contact element in response to a first displacement of the switch button, it moves in a direction substantially opposite to a direction of the axial motion to permit further displacement of the switch button.

6. The flashlight of claim 5 wherein the selected one of the circuit actuators is a spring biased element.

7. The flashlight of claim 6 where the spring biased element has a first spring force, and wherein the associated contact element requires a first operating force less than the first spring force.

8. The flashlight of claim 1 wherein at least all but one of the circuit actuators are movable elements, such that after actuating a contact element in response to a first displacement of the switch button, they move in a direction substantially opposite to a direction of the axial motion to permit further displacement of the switch button.

9. The flashlight of claim 1 wherein one of the circuit actuators has a shortest length, and is a fixed element.

10. The flashlight of claim 1 wherein the lamp element includes a plurality of independently operable lamps.

11. The flashlight of claim 10 wherein the circuit element has an independent connection from each of the contact elements to at least one of the lamps, such that actuating different contact elements actuates different lamps.

* * * * *

UNITED STATES PATENT AND TRADEMARK OFFICE
CERTIFICATE OF CORRECTION

PATENT NO. : 7,549,765 B2 Page 1 of 1
APPLICATION NO. : 11/700739
DATED : June 23, 2009
INVENTOR(S) : Paul Y. Kim, William A. Hunt and Lai Chang Tang It is certified that error appears in the above-identified patent and that said Letters Patent is hereby corrected as shown below:

In column 1, line 25, change "on and "off". to --"on" and "off."--.

In column 1, line 39, change "damaged" to --damage--.

In column 2, line 25, change "figure to" to --FIG. 2--.

in column 2, line 43, change "26" to --24--.

In column 4, line 12, change "each switches" to --each switch's--.

Signed and Sealed this

First Day of September, 2009

David J. Kappos
*Director of the United States Patent and Trademark Office*